United States Patent [19]

Fomenkov

[11] Patent Number: 5,450,207
[45] Date of Patent: Sep. 12, 1995

[54] METHOD AND APPARATUS FOR CALIBRATING A LASER WAVELENGTH CONTROL MECHANISM

[75] Inventor: Igor Fomenkov, San Diego, Calif.

[73] Assignee: Cymer Laser Technologies, San Diego, Calif.

[21] Appl. No.: 93,355

[22] Filed: Jul. 16, 1993

[51] Int. Cl.⁶ .............................................. G01J 3/51
[52] U.S. Cl. .................... 356/416; 250/372; 250/226; 359/886; 372/32
[58] Field of Search ............ 356/432, 437, 409, 440, 356/256, 416; 372/92, 98, 105, 32, 57, 11, 32; 250/343, 339, 372, 226; 359/886

[56] References Cited

U.S. PATENT DOCUMENTS

| | | | |
|---|---|---|---|
| 4,684,258 | 8/1987 | Webster | 356/256 |
| 4,823,354 | 4/1989 | Znotins et al. | 372/57 |
| 5,068,864 | 11/1991 | Javan | 372/32 |

Primary Examiner—Vincent P. McGraw
Attorney, Agent, or Firm—Blakely, Sokoloff, Taylor & Zafman

[57] ABSTRACT

Calibration of a wavelength adjustment mechanism of a laser is achieved using a hollow cathode absorption lamp. The lamp is provided with a vaporous material having a precisely known wavelength of maximum absorption. A photo-detector detects the amount of light from the laser beam absorbed by the vaporous material as a function of wavelength. The wavelength of the laser is adjusted to achieve maximum absorption such that the actual laser beam wavelength may be compared with an expected, wavelength to determine a calibration offset. The hollow cathode lamp is operated to produce a vaporous material of known absorption characteristic but is illuminated at a level substantially below a level required for conventional opto-galvanic resonance.

33 Claims, 4 Drawing Sheets

METHOD AND APPARATUS FOR CALIBRATING A LASER WAVELENGTH CONTROL MECHANISM

BACKGROUND OF THE INVENTION

1. Field of the Invention

The invention generally relates to lasers such as excimer lasers and, in particular, relates to the calibration of lasers and the detection of wavelength drift within such lasers.

2. Description of Related Art

Lasers such as excimer lasers are commonly employed in a wide variety of applications. Often, the output wavelength or frequency of the excimer laser must be precisely regulated to be substantially constant as a function of time and operating conditions. One such application which requires precise wavelength regulation is the use of excimer lasers in the fabrication of integrated circuits.

Conventional techniques for fabricating integrated circuits use a laser beam generated by an excimer laser to harden an optically sensitive material. Portions of the material not hardened by the laser beam are subsequently etched away. Additional fabrication steps are employed to achieve a circuit matching the shape of the hardened material. The short wavelength of an excimer laser operating in the deep ultraviolet region provides the potential for very sharp edge definition. However, when hardening the optically sensitive material using the laser beam from the excimer laser, the wavelength of the laser beam must be precisely controlled to match the wave length for which the optics of the system were designed and setup. A variation in the wavelength of the laser beam can cause the beam to be defocused at the surface of the optically sensitive layer, thereby loosing the advantage of the short wave length and resulting in an imprecise rendering of the integrated circuit. This can adversely affect the electrical characteristics of the resulting integrated circuit, resulting in a poor quality or inoperable circuit. Accordingly, precise regulation of the output wavelength of the excimer laser is critical in the fabrication of the integrated circuits. Other applications using excimer lasers also require precise control of the wavelength of the laser.

U.S. Pat. No. 4,959,840, "Compact Excimer Laser Including an Electrode Mounted in Insulating Relationship to Wall of the Laser", assigned to Cymer Laser Technologies, assignee of the present application, describes a pulsed excimer laser suitable for the use in the fabrication of integrated circuits. U.S. Pat. No. 4,959,840 is incorporated by reference herein, and is referred to hereinafter as the "'840 patent".

U.S. Pat. No. 5,025,445 entitled "System for, and Method of, Regulating the Wavelength of a Light Beam", also assigned to Cymer Laser Technologies, provides a wave-meter apparatus for use with an excimer laser for precisely regulating the wavelength output from the excimer laser. The wavelength regulation technique of U.S. Pat. No. 5,025,445 is appropriate for use in controlling the output wavelength of the excimer laser of the '840 patent as well as other lasers. U.S. Pat. No. 5,025,445 is also incorporated by reference herein and is referred to hereinafter as the "'445 patent".

The wavelength regulation method and apparatus described in the '445 patent provides an effective technique for precisely regulating the wavelength of an excimer laser. In one embodiment of the invention set forth in the '445 patent, a laser light beam is processed in a first optical path to produce light indications in a plurality of free spectral paths. The light indications are introduced through slits to produce signals at spaced positions at opposite peripheral ends of a linear detector array. The distances between correlated pairs of energized detectors being indicate the relative value of the laser wavelength in the free spectral ranges. Spectral laser light beam is also processed in the second optical path simultaneously with the processor beam of the first optical path, to produce light in a single path. The second optical path is dependent on the wavelength laser light beam. The light produced in the second optical path may be introduced through another slit to energize centrally disposed detectors in the array. The particular detectors energized are dependent upon the wavelength of the laser light. The detectors in the linear array is scanned to produce signals related in time to the disposition of the detectors energized in the array. A data processing system processes the signals and produces a signal to adjust the wavelength of the laser beam to a particular value.

The wavelength regulation technique of the '445 patent operates to precisely regulate the wavelength of the laser beam. However, the accuracy of the technique depends upon an initial calibration of the wavemeter system. If improperly calibrated, the wavemeter will operate to precisely regulate the wavelength of the laser to a wavelength offset from an intended wavelength.

Several conventional techniques may be employed for calibrating the output of a laser. These conventional techniques may be employed for calibrating a laser fitted with the wave-meter of the '445 patent. One such conventional calibration technique employs an opto-galvanic sensor. A typical opto-galvanic sensor includes a hollow cathode lamp positioned within a path of a laser beam. The hollow cathode lamp is filled with a selected filler gas such as hydrogen, helium, neon, or mixtures of argon and neon, krypton and neon, or xenon and neon. An anode and a cathode are mounted within the lamp with the cathode having an annular or tubular shape. The cathode is aligned with the laser beam whereby the laser beam passes through an interior of the cathode without touching the cathode material. The cathode is fabricated from any of a large number of elemental materials such as silver, aluminum, gold, iron, or zirconium. In use, an electrical current is conducted through the anode and cathode causing the filler gas within the cathode to be ionized and causing a portion of the material of the cathode to vaporize. The ionized gas and the vaporous cathode material form a plasma in the interior of the cathode within the path of the laser beam. For certain wavelengths of the laser, and depending upon the composition of the filler gas and the cathode material, a resonance can occur between the plasma and the incident laser beam. When the wavelength of the laser is resonance with certain absorption wavelengths of atoms and molecules within the plasma, electrical properties of the plasma are altered. This phenomena is generally referred to as the opto-galvanic effect. The resonance within the plasma affects electrical properties of the current conducted through the anode and cathode. These electrical properties are detected and correlated with the laser beam to yield a determination of the wavelength of the laser beam. Typically, the wavelength of the laser beam is adjusted to achieve a maximum resonance, with the correct wavelength, corresponding to the maximum resonance, being predetermined from the composition of the filler gas and cathode materials. Hence, knowledge of the resonance wavelength may be used to calibrate the laser beam. Typically, a specific combination of cathode material and filler gas is chosen to provide a resonance wavelength in a vicinity of an intended operational wavelength of the laser. For example, by selecting silver as the cathode material and helium as the filler gas material, a certain wavelength of maximum resonance is achieved against which the output of the laser is calibrated.

An exemplary opto-galvanic sensor is illustrated in FIGS. 1A and 1B. Opto-galvanic sensor 10 includes a transparent vacuum tube 12 having an entrance window 14 and an exit window 16. An anode 18 and a cathode 20 are mounted therein. A laser beam, identified by reference numeral 22, enters entrance window 12, passes through the interior of cathode 20 and exits through exit window 16. Circuitry for powering sensor 10, detecting a resonance effect within sensor 10 and adjusting the wavelength of the laser beam to achieve a maximum resonance are not fully shown in FIG. 1. Although laser beam 22 is illustrated with a single narrow line, it should be understood that the beam actually has a width, which may be almost equal to an internal diameter to cathode 20.

Although the opto-galvanic resonance effect has been used somewhat effectively in calibrating lasers, there are several disadvantages inherent in the opto-galvanic technique. A first disadvantage is that alignment of the laser beam and the opto-galvanic sensor is critical. Care must be taken to ensure that the laser beam does not directly strike the cathode material, otherwise substantial photo-electric noise may be generated, obscuring the desired electrical signals. Precise alignment is particularly difficult to achieve with laser beams having fairly broad beam widths or waists. Indeed, for laser beams having a beam width greater than an interior diameter of the cathode, alignment cannot be achieved and the beam will necessarily strike portions of the cathode. Such is a particular problem when a cliffuser is placed in the laser beam, as the diffuser broadens the width of the beam. Such diffusers are commonly employed with an excimer laser, such as the one described in the '840 patent, to eliminate wavelength variations across the beam thereby achieving a beam having uniform wavelength. Hence, for systems employing a diffuser within the path of the laser beam, an opto-galvanic sensor employing the opto-galvanic resonance effect sometimes cannot effectively be used as a calibration tool. Even where the width of the laser beam is somewhat less than the internal diameter of the cathode, alignment may be difficult.

Another disadvantage of calibrating a laser beam using the opto-galvanic effect, is that considerable laser power is required to generate a resonance condition. In many circumstances the laser beam employed for calibration does not provide sufficient intensity to allow for calibration using the opto-galvanic effect. Even for lasers which are capable of producing a sufficiently intense beam, it is often desirable to calibrate the laser without using a high output power level.

Accordingly, although a calibration technique which exploits the opto-galvanic resonance effect to determine the wavelength of a laser beam is effective for some applications, it is ineffective for others. It is desirable to provide an alternative calibration technique which determines the output wavelength of a laser beam even where a relatively low power beam is employed or where the laser beam is wide relative to the cathode of an opto-galvanic sensor.

SUMMARY OF THE INVENTION

From the foregoing it can be appreciated that there is a need to provide an improved method and apparatus for calibrating a wavemeter system used to control the wavelength of a laser beam, particularly a beam output from an excimer laser. It is one of the general objects of the invention to provide such an improved calibration technique. It is a particular object of the invention to provide a calibration technique effective with use for laser beams having relatively low intensity or laser beams having relatively wide beams. It is a further object of the invention to provide a method and apparatus for detecting drift within a laser wavemeter system. It is a further object of the invention that the improved calibration technique be a relatively inexpensive and easy to use technique employing conventional sensor components.

These and other general objects of the invention are achieved by an apparatus for determining the wavelength of a laser beam using a hollow cathode lamp positioned within a path of a laser beam where the hollow cathode lamp absorbs a portion of the laser beam when the wavelength of the beam matches an atomic resonance wavelength of the lamp.

In accordance with one embodiment of the invention, the laser beam has an adjustable wavelength, with the wavelength being adjustable by a wavelength adjustment mechanism. A means is provided for measuring the wavelength of the laser beam, such as the wavemeter of the '445 patent described above. An apparatus for calibrating the wavelength adjustment mechanism is provided. The apparatus includes:

a vacuum chamber positioned in a path of the laser beam output from a laser with filled with a vaporous material having a known wavelength of maximum absorption whereby a portion of the laser beam is absorbed by the vaporous material;

means for detecting an amount of absorption of the laser beam by the vaporous material;

means for determining the actual wavelength of the laser beam from a comparison of the detected amount of absorption and the known wavelength of maximum absorption.

In a preferred embodiment, the vacuum chamber is part of a hollow cathode lamp having an iron cathode mounted within the chamber. The hollow cathode lamp and its vacuum chamber are constructed so that the laser beam may pass through a plasma discharge region within the vacuum chamber. The chamber is filled with neon at low pressure. The vaporous material is formed by applying a current to the anode and cathode of an amount sufficient to vaporize a portion of the iron material of the cathode. The vaporous iron absorbs the laser beam with a maximum absorption occurring at about a wavelength of 248.327 nano-meters. The laser beam has a cross-sectional intensity level substantially below an intensity sufficient to cause a detectable opto-galvanic resonance signal. The means for detecting the amount of absorption comprises a photo-detector. A feed-back circuit is provided which adjusts the wavelength of the laser to achieve maximum absorption, then calibrates the laser to 248.327 nano-meters at that wavelength of maximum absorption.

Thus, the preferred embodiment of the invention uses a hollow cathode lamp (HCL) for calibrating a laser. The hollow cathode lamp may be in the form of an opto-galvanic sensor. However, the HCL is not operated as a conventional opto-galvanic sensor. Rather than driving the sensor with a laser beam of sufficient intensity to generate an opto-galvanic resonance effect as is customary with opto-galvanic sensors, the HCL of the invention is merely used to generate a vaporous material for absorbing light. Furthermore, a conventional opto-galvanic sensor determines the wavelength of a laser beam by measuring the electrical characteristics of the current conducted through an anode and a cathode of the sensor to detect a resonance condition. However, the HCL of the invention is not employed to achieve an opto-galvanic resonance effect. The electrical characteristics of the current flowing through the cathode and anode are neither detected nor measured. Rather, a photo-detector is positioned to detect light transmitted through the HCL. The amount of absorption of the laser beam caused by the vaporous material within the vacuum chamber of the sensor is measured. Hence, the HCL is used as a means for generating an appropriate amount of vaporous material, having a known wavelength of maximum absorption, and for confining the vaporous material within the path of the laser beam.

The apparatus of the invention has several advantages over conventional calibration techniques employing opto-galvanic sensors. One advantage is that a much lower intensity laser beam may be employed than is required for use with opto-galvanic resonance sensors. Moreover, precise alignment of a cathode of the HCL with the laser beam is not required. Any accidental illumination of the cathode by the relatively low intensity beam will not affect or degrade the absorption characteristics of the HCL. Further, the calibration technique of the invention may be employed on laser beams having a width greater than an internal diameter of the cathode of the HCL. Hence, diffusers may be employed within the path of the laser beam for averaging the wavelength across the beam. Thus, a relatively low intensity laser beam may be employed, and critical alignment need not be achieved. Moreover, complicated circuitry for detecting an opto-galvanic resonance condition is not required. Rather, a conventional photo-detector may be employed for detecting the amount of absorption of the laser beam.

The general principles of the invention are also embodied within a method for calibrating the wavelength of the laser, wherein the method includes the steps of passing a laser beam through an HCL having a chamber filled with a vaporous material of known wavelength of maximum absorption, detecting an amount of absorption of tile laser beam by the vaporous material, and adjusting the wavelength of the laser to achieve an amount of maximum absorption. The output wavelength of the laser is calibrated based on the known wavelength of maximum absorption.

In one embodiment of the invention, a method for detecting drift in the wavelength output by the laser is provided. Drift is detected by repeating the steps of passing the laser beam through an vacuum chamber, detecting an amount of absorption of the laser beam by the vaporous material and adjusting the wavelength of the laser to again achieve an amount of maximum absorption. Then, the amount of adjustment of the wavelength of the laser beam is measured, with the measured amount being representative of an amount of drift in the wavelength of the laser. Preferably, drift measurements are performed every several days or weeks to determine how often re-calibration of the laser is required.

BRIEF DESCRIPTION OF THE DRAWINGS

The present invention will be understood more fully from the detailed description given below and from the accompanying drawings of the preferred embodiment of the invention in which.

DETAILED DESCRIPTION OF THE INVENTION

A system for calibrating a laser having an adjustable wavelength, and its associated wavelength measurement system is disclosed. In the following detailed specification, to provide a thorough understanding of the present invention, numerous specific details are set forth. It will, however, be apparent to one skilled in the art that the present invention may be practiced without the specific details described herein.

Figure 2:
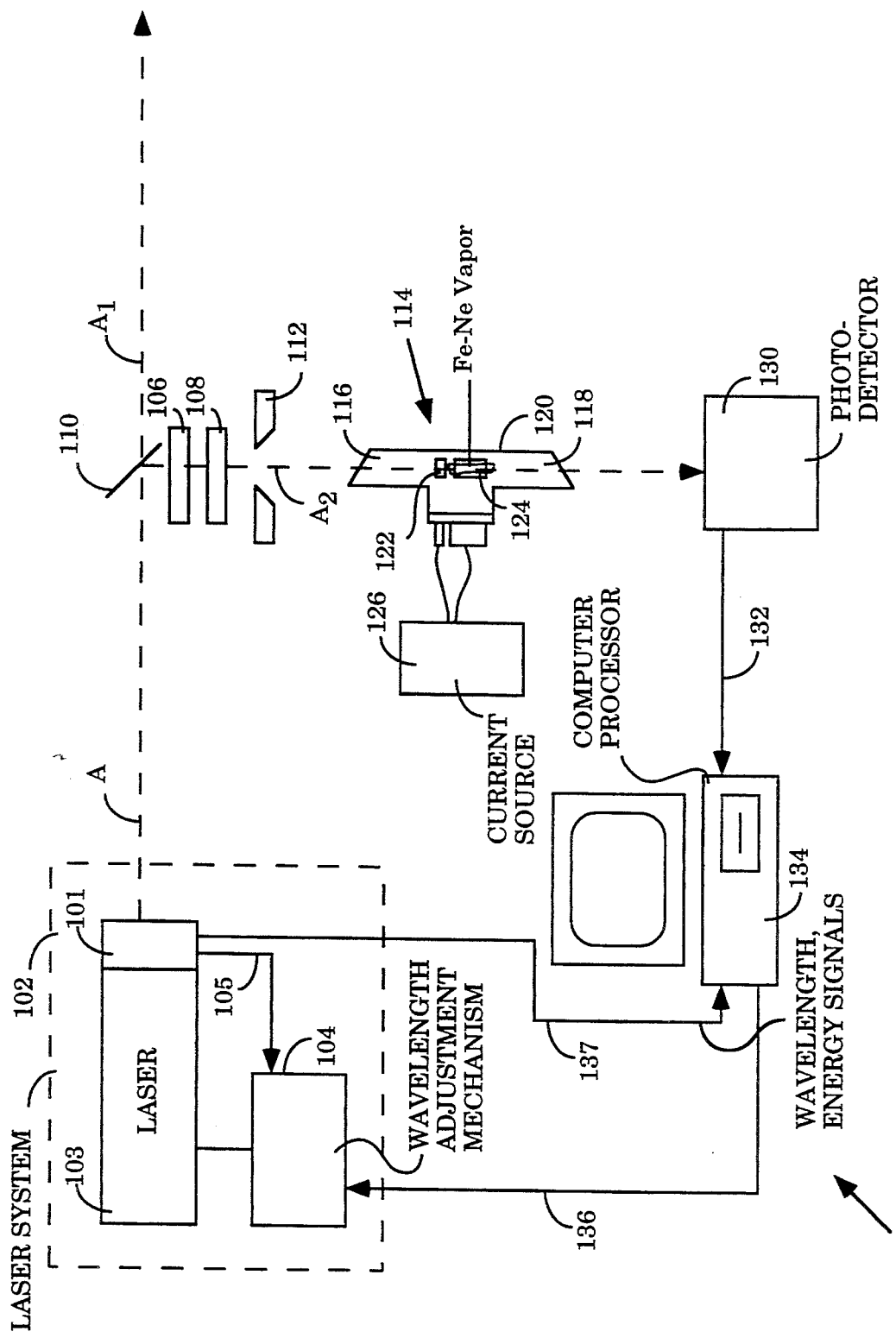
FIG. 2 schematically illustrates a laser wavelength calibration system configured in accordance with a preferred embodiment of the invention incorporating a HCL.
Figure 3:
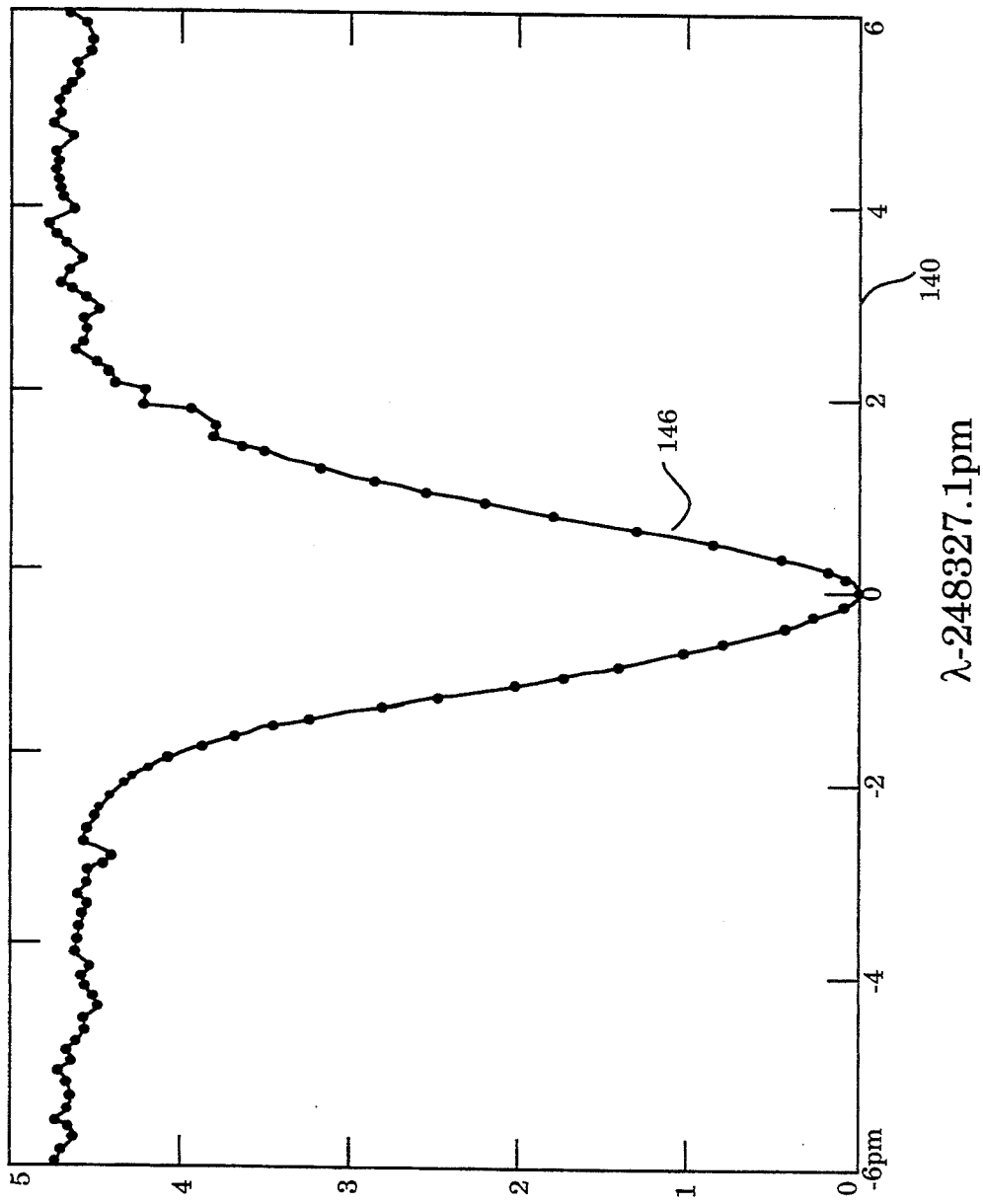
FIG. 3 is a graph illustrating the absorbed laser spectrum for a laser beam transmitted through the HCL of FIG. 2.

Referring to FIGS. 2 and 3, a preferred embodiment of the invention will now be described. FIG. 2 shows the primary elements of a calibration system 100 and a tunable laser system 102. Laser system 102 includes a laser 103, a wavemeter 101 which samples a laser beam. A and determines the wavelength of beam A, and a wavelength adjustment mechanism 104 which operates to selectively vary the wavelength over a specified range. Laser 103 may be any of a number of types of lasers. However, it is anticipated that laser 103 is an ultra-violet excimer laser such as the laser described within the '840 patent, summarized above in the description of related art.

In normal operation, wavelength adjustment mechanism 104 is controlled by wavemeter 101. If wavemeter 101 detects that the wavelength of beam A is not equal to a desired wavelength, a corrective signal is sent via path 105 to wavelength adjustment mechanism 104 to correct the error. The accuracy of the wavelength of output beam A is therefore equal to the accuracy of the calibration of wavemeter 101. One purpose of this invention to provide a means for accurately calibrating the wavemeter system.

Some embodiments of a tunable laser system do not incorporate a wavelength measurement system such as wavemeter 101. Rather, wavelength calibration is achieved directly by a wavelength adjustment mechanism. In such embodiments, wavelength calibration is inherently provided by an element of the wavelength adjustment mechanism such as by the angular position of an optical component, the density of a gas in a pressure-tuned system, the temperature of a component in a temperature tuned system, etc. The present invention can be used to calibrate the wavelength adjustment mechanism directly, in those systems which do not employ a wavemeter.

Calibration system 100 will now be described with continued reference to FIG. 2. Calibration system 100 includes a beam splitter 110, positioned within the path of beam A which splits beam A into primary and secondary beams $A_1$ and $A_2$ respectively. Primary beam $A_1$ is subsequently processed and utilized by means not shown in accordance with a desired application, such as the fabrication of integrated circuits. Although primary beam $A_1$ may be used in any of a number of applications, it is anticipated that beam $A_1$ is used in an application requiring a laser beam having a substantially constant wavelength as a function of time, such as the aforementioned fabrication of integrated circuits.

A variety of techniques may be employed for adjusting the wavelength of laser system 102, depending upon the specific nature and construction of the laser. However, in the preferred embodiment, laser system 102 outputs a laser beam having a wavelength in the range 247.9 to 248.7 nano meters (nm). Wavelength adjustment mechanism 104 is capable of adjusting the wavelength of laser beam A throughout the aforementioned range with a wavelength step of approximately $S=0.1$ pico meters (pm). Beam splitter 110 may be a partially reflecting mirror configured to transmit most of beam A as primary beam $A_1$ and reflect only a portion of bear A as secondary beam $A_2$. As will be described in more detail below, calibration system 100 processes secondary beam $A_2$ for calibrating the wavemeter 101 of laser 102.

Secondary beam $A_2$ is substantially monochromatic but may exhibit slight variations in wavelength across a cross section of the beam. A pair of diffusers 106 and 108 are positioned within the path of beam $A_2$. Diffusers 106 and 108 operate to average the wavelength of the beam across the cross section of the beam to substantially eliminate any slight deviations in beam wavelength. As a result of the operation of diffusers 106 and 108, beam $A_2$ may have a somewhat broader beam width or beam waist after emerging from the diffusers.

Calibration system 100 also includes a diaphragm 112. Diaphragm 112 is positioned along a path of secondary beam $A_2$ between diffuser 108 and an HCL 114. Diaphragm 112 has an internal diameter approximately equal to a clear aperture of HCL 114.

HCL 114 includes a transparent entrance window 116 and a transparent exit window 118, each tilted at an angle of about 10 degrees from the path of secondary beam $A_2$. Input window 116 and output window 118 form portions of a vacuum chamber 120 having an anode 122 and a cathode 124 mounted therein. Cathode 124 is a generally tubular or annular cathode aligned with secondary beam $A_2$ such that beam is transmitted through an interior aperture of cathode 124. Anode 122 and cathode 124 are electrically connected to a current control mechanism 126 which allows a selected amount of electrical current to be conducted through the anode and cathode.

Figure 1:
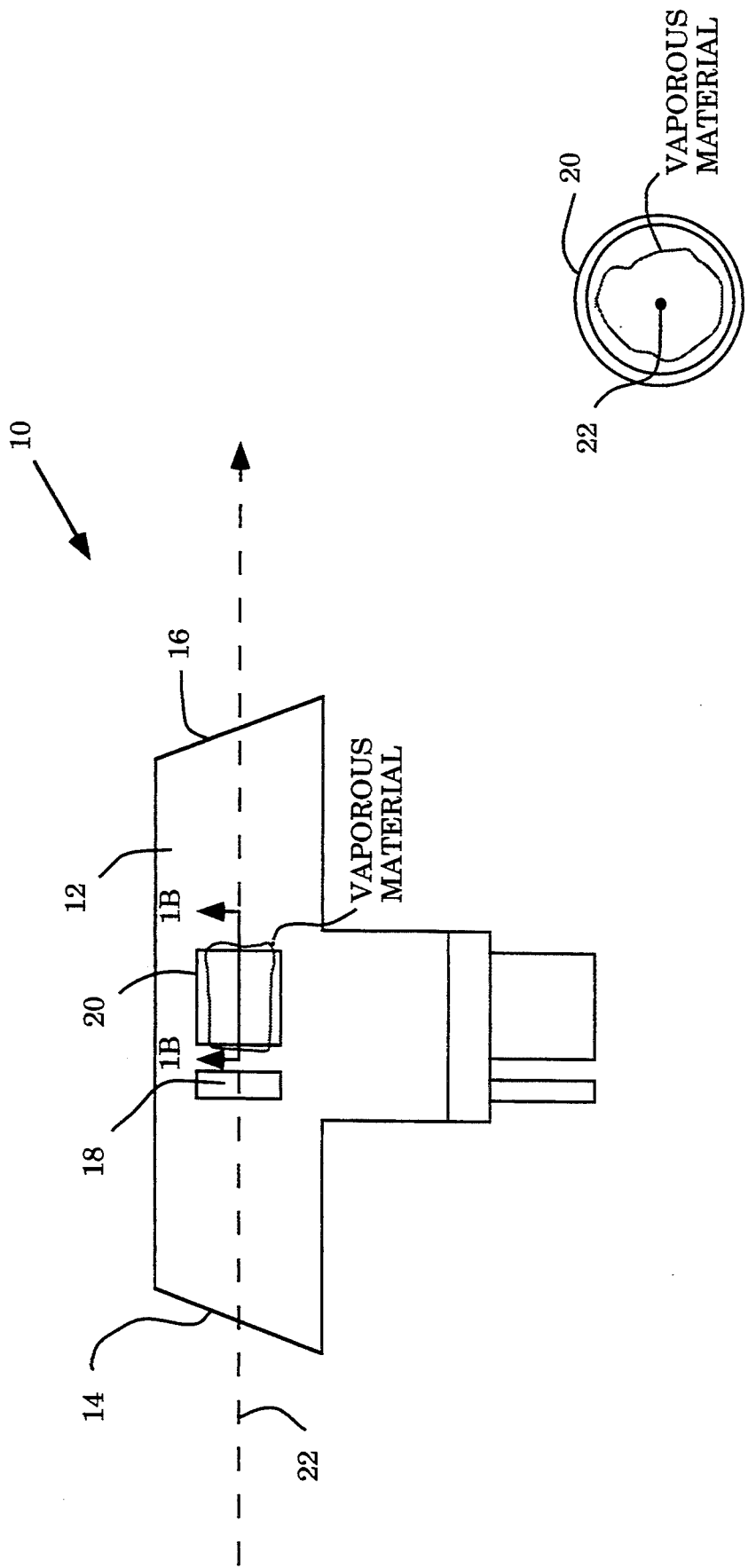
FIG. 1A illustrates a side view of conventional opto-galvanic sensor.
FIG. 1B illustrates an end view of a cathode of the opto-valvanic sensor of FIG. 1A, taken along line 1B—1B.

In a preferred embodiment of the invention, cathode 124 is fabricated from iron and vacuum chamber 120 is filled with a neon filler gas. HCL 114 may be constructed in accordance with the prior art lamp of FIG. 1. However, HCL 114 is not operated as an opto-galvanic sensor. Whereas a conventional opto-galvanic sensor includes sensor circuitry for detecting a resonance condition within a vacuum chamber, HCL 114 of FIG. 2 requires no such sensor circuitry. Rather, HCL 114 is merely connected to current control mechanism 126 which controls the amount of current conducted through anode 122 and cathode 124. Resonance condition sensing circuitry is not required.

Although laser beams $A_1$ and $A_2$ are illustrated in FIG. 2 as narrow lines, the beams actually have a width which may exceed the internal diameter of cathode 124 of lamp 114.

In use, a pre-selected amount of current is conducted through anode 122 and cathode 124 causing vaporization of a portion of the iron material forming cathode 124. The vaporous material fills the interior of cathode 124 through which secondary beam $A_2$ is transmitted. The vaporous material absorbs a portion of secondary beam $A_2$ at a wavelength determined by characteristics of the cathode material. For the preferred embodiment, wherein the cathode is fabricated from iron, a wavelength of maximum absorption occurs at a wavelength $=248.3271$ nm with a lesser amount of absorption occurring at wavelengths in the vicinity of 248.3271 nm and with little or no absorption occurring at wavelengths remote from the wavelength of maximum absorption. Other absorption wavelengths exist and can also be used for calibration.

Secondary beam $A_2$, after possible partial absorption within chamber 120, exits lamp 114 through exit window 118 and into a photo-detector 130. Photo-detector 130 operates to detect the amount of light actually transmitted through lamp 114. As can be appreciated, the amount of light detected by photo-detector 130 depends upon the wavelength of secondary beam $A_2$, with relatively less light being detected for a wavelength near the wavelength of maximum absorption and with a greater amount of light detected for other wavelengths. Photo-detector 130 outputs a signal representative of the amount of light detected along a line 132 to a computer processor 134.

As a refinement, in addition to monitoring the intensity of the light striking the photo detector 130, the computer processor may also receive a signal representative of the initial intensity (energy) of beam $A_1$ and then divide the intensity detected by the photo detector by the initial intensity of beam $A_1$. An energy monitor system contained in the laser system 102 (not shown in FIG. 2) may be used to provide the energy signal. The resulting ratio of the two intensities represents the relative absorption by the hollow cathode lamp 114, and is insensitive to fluctuations in the initial intensity of the laser beam $A_1$. For a pulsed laser, the ratio can be calculated for each pulse. If the laser system 102 does not provide a signal representative of the intensity of each laser pulse, then a separate, external beam splitter and photo detector may be inserted into beam path $A_2$ to directly monitor the laser intensity incident on lamp 114.

In use, computer processor 134 directly controls adjustment mechanism 104 along line 136 causing it to slew the wavelength of laser 102 throughout, at least, a range covering the wavelength of maximum absorption, $1=248.3271$ nm for the example described herein. The normal wavelength control line 105 is disabled during this process. As the wavelength of the laser beam is incrementally adjusted throughout that range, computer processor 134 stores and monitors signals received from photo-detector 130 and wavemeter 101 to determine the wavemeter reading at the point of maximum absorption. With the actual wavelength of maximum absorption being predetermined and pre-stored, processor 134 determines any calibration factors necessary for adjusting the wavelength calibration of wavemeter 101. For the case of directly calibrating wavelength adjustment mechanism 104, as previously discussed, computer processor 134 monitors photo detector 130 to determine the input value for adjustment mechanism 104 which corresponds to the point of maximum absorption.

Continuing with the example wherein cathode 120 is fabricated from iron and the wavelength of maximum absorption occurs at 248.3271 nm, processor 134 causes the wavelength of laser 102 to be slewed through wavelengths within a vicinity of 248.3271 nm until a wavelength of maximum absorption is detected. Then, processor 134 compares the wavelength reading transmitted by wavemeter 101 with 248.3271 nm to determine if any offset exists. Thus, if the wavemeter reading at the point of maximum absorption was, in fact, 248.3200 nm, rather than 245.3271 nm then a calibration offset of 7.1 pm is required. This calibration offset is incorporated into the calibration of the wavemeter so that the reading is correct at the maximum absorption. As a refinement, rather than merely identifying a wavelength value yielding a greater amount of absorption than all other valves, curve fitting and interpolation techniques are preferably employed to more precisely and reliably determine the wavelength of maximum absorption.

FIG. 3 illustrates the absorbed laser spectrum detected by photo-detector 130 and processed by computer processor 134 for an iron/neon vapor. In FIG. 3 horizontal axis 140 illustrates the actual wavelength in units of pico-meters offset from 248.3271 nm. Vertical axis 144 illustrates a normalized intensity signal generated by photo-detector 130 representative of the light intensity measured by the detector. As can be seen from FIG. 3, the laser beam is sharply absorbed at the wavelength of maximum absorption 248.3271 nm. Depending on the spectral width of the laser beam, little or no absorption occurs at wavelengths more than two or three pico-meters from the wavelength of maximum absorption. Thus, the spectrum of iron/neon vapor includes a fairly narrow absorption spike. In FIG. 3, the absorption spectrum is represented by curve 146 with individual values for curve 146 represented by dots separated by a wavelength step of $S=0.116$ pm. These points represent actual values detected by photo-detector 130 and recorded by computer processor 134.

Referring again to FIG. 2, computer processor 134 includes appropriate software for receiving and storing input intensity values and for determining the wavelength of maximum absorption from these stored intensity values using conventional curve fitting and interpolating algorithms. Computer processor 134 is provided with additional software for comparing the detected wavelength of maximum absorption with a corresponding output value transmitted along line 136 and for determining the calibration offset therefrom. Computer processor 134 may be any of a number of conventional personal computers. Alternatively, however, a wide variety of other processors may be used, including, for example, an embedded processor mounted directly within wavemeter 101. Alternatively, a computer processor is not required, with an operator manually comparing intensity values detected by photo-detector 130 with manual input values provided to adjustment mechanism 104. In such an embodiment, photo-detector 130 is preferably provided with a graphical display illustrating received light intensity as a function of wavelength. In general, however, 130 may be any of a variety of conventional photo-detectors capable of detecting the intensity of a laser beam.

For the examples described herein, laser 102 provides a laser beam having a wavelength in the range of 247.9 nm to 248.7 nm. As can be appreciated, iron is selected as the material for cathode 124 since iron provides a wavelength of maximum absorption at 248.3271 nm, well within the operating range of laser 102. For a laser providing a beam having a different wavelength range, a different cathode material may be required. In general, the cathode material of HCL 114 is pre-selected to provide a wavelength of maximum absorption within the output wavelength range of laser 102 and preferably near a desired operational wavelength. For the specific application of the fabrication of integrated circuits, an operational wavelength within the range 248.2 and 248.5 nano-meters is desired. Hence, an iron HCL provides an ideal calibration wavelength.

The selection of appropriate cathode materials and filler gasses for lamp 114 for use with specific wavelength ranges is in accordance with conventional technology. Accordingly, a complete list of absorption wavelengths corresponding to various materials and gasses is not provided herein.

One reason that an HCL is employed to provide the absorption vapor is that conventional HCLs are readily fabricated with any of a variety of component materials. An HCL appropriate for use as lamp 114 is the Galvatron L2783 series HCL provided by Hamanatsu Corporation of Tokyo, Japan. The Galvatron sensor is fabricated using any of nearly sixty cathode materials in combination with several filler gas materials, providing a large number of different absorption wavelengths allowing virtually any laser to be calibrated. As noted above, however, HCL 114 is not operated as an opto-galvanic sensor. Typically, a fairly high intensity laser beam is required generate the opto-galvanic resonance condition. Further, precise alignment of the conventional sensor with a laser beam is critical since any illumination of the cathode of the sensor by the laser beam causes secondary photo emissions which may prevent reliable operation of the sensors.

In contrast, HCL 114 of the invention is operated at a level substantially below an opto-galvanic resonance level. In other words, the intensity of light beam $A_2$ may be substantially below an intensity required to achieve opto-galvanic resonance. Secondary beam $A_2$ requires only sufficient intensity to allow reliable detection by photo-detector 130. The use of a relatively low intensity beam is particularly desirable for the configuration of FIG. 2 since only a portion of initial laser beam A is required to be reflected along path $A_2$ for detection and calibration. This allows a large portion of beam A to be transmitted as operational beam $A_2$ without any substantial loss of operational beam intensity. Furthermore, diffusers 106 and 108 may be positioned within the beam to average the wavelength of the beam across a cross section of the beam. With conventional opto-galvanic sensors, diffusers can not be employed since the diffuser lowers the intensity of the beam to a point below opto-galvanic resonance and further broadens the beam by an amount whereby the beam strikes the cathode causing secondary emissions and preventing reliable operation. By using a HCL in a manner described herein, diffusers can be used since a relatively low intensity beam is acceptable for calibration purposes and since precise alignment of the calibration beam and the cathode of the HCL is not critical.

Although, the invention preferably employs an HCL, in alternative embodiments other cathode lamp means for generating a vapor for absorbing a portion of the laser beam may be employed. The HCL is preferred since it is conventional and reliable and can be readily obtained with desired cathode and filler gas materials.

In the embodiment described thus far the wavemeter is calibrated at a single known wavelength, i.e. the maximum absorption wavelength for one absorption feature of the iron hollow cathode lamp. The accuracy of the calibration during operation of the laser at a wavelength offset from this wavelength depends upon the design of the wavemeter. Calibration of the wavemeter at several wavelengths is possible by using more than one calibration wavelength within the operational range, with unique calibration offsets determined for each of the predetermined calibration wavelengths. These techniques will not be described further herein.

Figure 4:
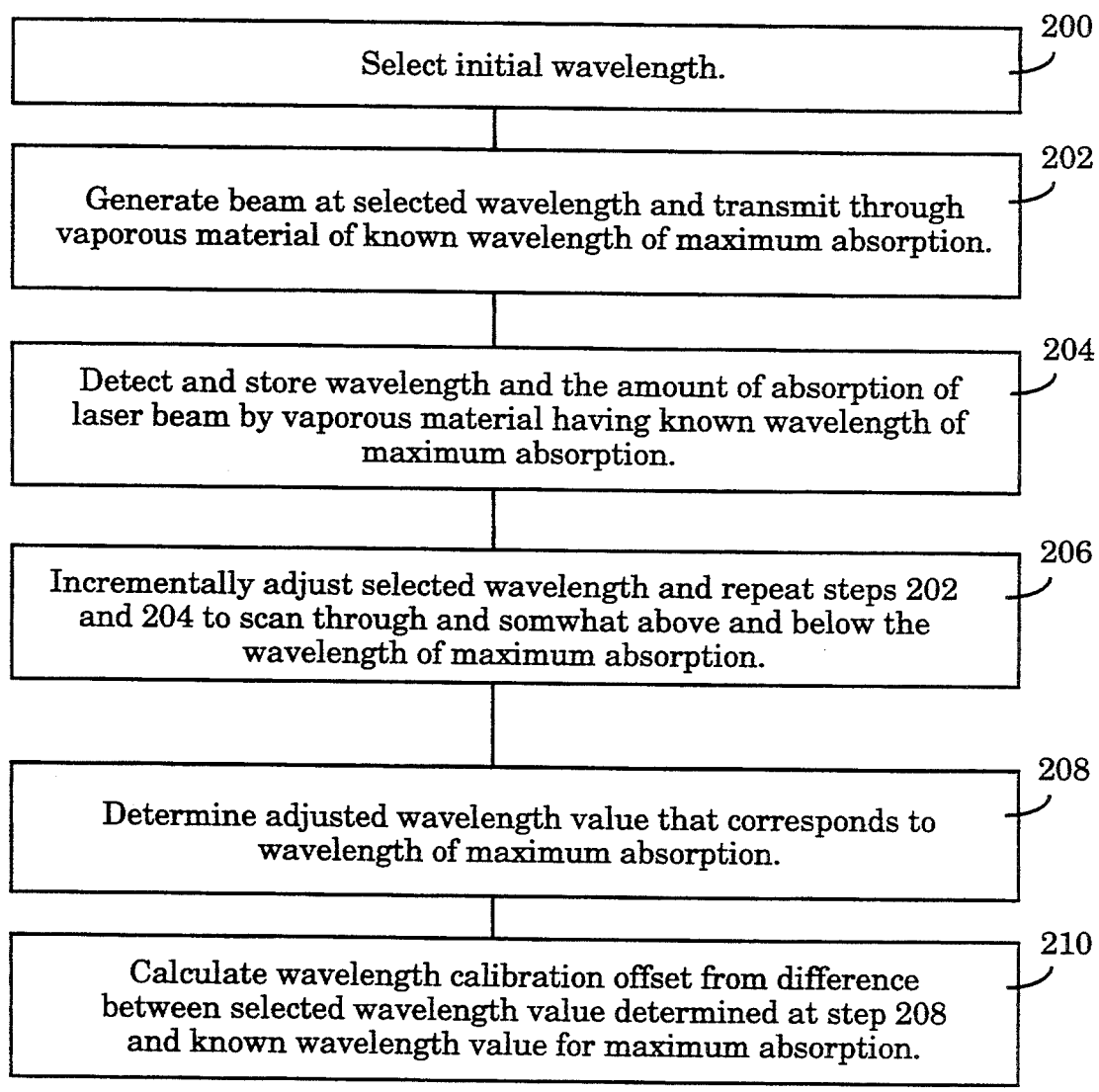
FIG. 4 is a block diagram illustrating a method for calibrating a laser in accordance with a preferred embodiment of the invention.

FIG. 4 illustrates the general method of the invention and further illustrates a method for detecting wavelength drift within a laser. At 200, an input wavelength value is set at a bottom end of a desired wavelength range which includes at least a predetermined expected wavelength of maximum absorption. At 202, a laser beam is generated at the selected input wavelength and the beam is transmitted through a vaporous material having the predetermined wavelength of maximum absorption. The amount of absorption of the laser beam is detected at 204. Steps 202 and 204 are repeated for incrementally adjusted wavelengths throughout the pre-selected wavelength range (at step 206). The preselected wavelength range extends somewhat above and below the expected wavelength of maximum absorption.

At 208, the input wavelength corresponding to the actual wavelength of maximum absorption is determined from a comparison of individual absorption values measured for each incremental wavelength. This determination is best performed by interpolating a wavelength of maximum absorption from all absorption values throughout the preselected range. Conventional curve fitting techniques may be employed to interpolate the wavelength of maximum absorption. Interpolation by curve fitting is preferred to simply selecting the wavelength value having maximum absorption since curve fitting effectively averages the absorption values and thereby minimizes any imprecision caused by noise.

A calibration offset value is calculated, at step 210, from a comparison from the actual wavelength of maximum absorption with the input wavelength corresponding to maximum absorption. The calibration offset is subsequently employed during operation of the laser to adjust an input wavelength to yield an actual output laser beam wavelength substantially corresponding to the desired input wavelength. Although FIG. 4 illustrates that absorption values are determined for each incremental wavelength within an entire range, absorption measurements for all incremental wavelengths within the range are not necessarily required. Rather, the wavelength of maximum absorption may be determined based on only a portion of the wavelength range. In this regard, it can usually be assumed that the absorption spectrum has only a single substantial absorption spike within the desired wavelength range. Hence, once a substantial spike is located, additional absorption values need only be measured to determine the center of the spike and absorption values for the remaining incremental wavelengths within the range need not be measured. Care must be taken to ensure a noise spike is not erroneously interpreted as a wavelength of maximum absorption.

Although ideally suited for use with the wave-meter of the '445 patent and the excimer laser of the '840 patent, the principles of the invention may be employed for use in calibrating any of a wide number of lasers or other mono-chromatic optical sources and may be implemented in a variety of specific configurations. When used in combination with the wave-meter of the '445 patent, the calibration system of the invention may be provided as a separate component, or the components of the invention may be integrated with components of the wave-meter to achieve a compact configuration. The exemplary and preferred embodiments described herein are merely illustrative of the invention and do not limit the scope of the present invention.

I claim:

1. An apparatus for determining an actual wavelength of a laser being generated by a laser, wherein the laser beam has an adjustable wavelength, said apparatus comprising:

a hollow cathode lamp positioned in a path of a portion of the laser beam output from the laser, said lamp having a chamber filled with a vaporous material having a known wavelength of maximum absorption, said laser beam illuminating a portion of said vaporous material, with a portion of said laser beam being absorbed by said vaporous material, wherein said lamp includes an anode and a cathode positioned within said chamber with said vaporous material being formed by applying a current to said anode and cathode of an amount sufficient to vaporize a portion of material forming said cathode;

a photodetector for detecting an amount of absorption of said laser beam by said vaporous material; and means for determining the actual wavelength of the laser beam from a comparison of the detected amount of absorption and the known wavelength of maximum absorption.

2. The apparatus of claim 1, wherein said lamp includes an annular cathode, said annular cathode being aligned with said laser beam whereby said beam passes through an interior of said cathode.

3. The apparatus of claim 2, wherein the laser includes a wavelength measurement system which adjusts the wavelength of the laser to a target wavelength and wherein means are provided for calibrating the wavelength measurement system based on a comparison of the actual wavelength at maximum absorption to a wavelength indicated by the wavelength measurement system coinciding with maximum absorption.

4. The apparatus of claim 1, wherein said cathode is formed of iron.

5. The apparatus of claim 1, wherein said laser beam interacts with said vaporous material, said interaction being substantially below an opto-galvanic resonance interaction threshold.

6. The apparatus of claim 1, wherein said laser beam interacts with said vaporous material, said laser beam having an intensity substantially below an intensity sufficient to cause opto-galvanic resonance with said vaporous material.

7. The apparatus of claim 1, wherein said wavelength of said laser beam output from said laser is within the range of 247.9 to 248.7 nano-meters and said known wavelength of maximum absorption is about 248.327 nano-meters.

8. The apparatus of claim 1, further including a beam diffuser positioned along the path of the laser beam between the laser and said lamp.

9. The apparatus of claim 1, further including means for adjusting the wavelength of said laser beam throughout a wavelength range containing said wavelength of maximum absorption.

10. An apparatus for measuring the wavelength of a laser beam output from a laser, said apparatus comprising:
- a hollow cathode lamp positioned in a path of the laser beam output from the laser, said lamp having a chamber filled with a vaporous material having a known absorption characteristic, said laser beam illuminating a portion of said vaporous material, with a portion of said laser beam being absorbed by said vaporous material, wherein said laser beam interacts with said vaporous material, said laser beam having an intensity substantially below an intensity sufficient to cause opto-galvanic resonance with said vaporous material;
- a photodetector for detecting an amount of absorption of said laser beam by said vaporous material; and
- means for determining the actual wavelength of said laser beam from a comparison of an amount of absorption of said laser beam and the known absorption characteristic of said material.

11. An apparatus for calibrating a laser, wherein said laser outputs a laser beam, said apparatus having a wavelength adjustment mechanism which adjusts the wavelength of the laser to correspond to an input wavelength value, with the resulting actual wavelength of the laser possibly differing from the input wavelength value, said apparatus comprising:
- a hollow cathode lamp positioned in a path of the laser beam output from the laser, said lamp having a chamber filled with a vaporous material having a known wavelength of maximum absorption, said laser beam illuminating a portion of said vaporous material, with a portion of said laser beam being absorbed by said vaporous material, wherein said laser beam interacts with said vaporous material, said laser beam having an intensity substantially below an intensity sufficient to cause opto-galvanic resonance with said vaporous material;
- a photo-detector positioned along said beam beyond said lamp, said photo-detector detecting an amount of absorption of said laser beam by said vaporous material;
- a feedback mechanism operable to adjust the wavelength of said laser beam to achieve a maximum amount of absorption of said beam; and
- a calibration mechanism operable to calibrate the wavelength adjustment mechanism of the laser based on a comparison of the known wavelength of maximum absorption and an input wavelength value at the wavelength of maximum absorption.

12. The apparatus of claim 11, wherein said laser beam interacts with said vaporous material of said lamp, said interaction being substantially below an opto-galvanic resonance interaction threshold.

13. The apparatus of claim 11, wherein said wavelength of said laser beam output from said laser is within the range of 247.9 to 248.7 nano-meters and said known wavelength of maximum absorption is 248.3271 nano-meters.

14. The apparatus of claim 11, further including a beam diffuser positioned along the path of the laser beam between the laser and the lamp.

15. A method for determining an actual wavelength of a laser beam generated by a laser, wherein the laser outputs a laser beam having an adjustable wavelength, said method comprising the steps of:
- passing the laser beam through a cathode lamp, said lamp having a chamber filled with a vaporous material having a known wavelength of maximum absorption, said laser beam illuminating a portion of said vaporous material, with a portion of said laser beam being absorbed by said vaporous material, wherein said lamp includes an anode and a cathode positioned within said chamber with said vaporous material being formed by applying a current to said anode and cathode of an amount sufficient to vaporize a portion of material forming said cathode;
- detecting an amount of absorption of said laser beam by said vaporous material by means of a photodetector;
- adjusting the wavelength of the laser to achieve an amount of maximum absorption; and
- determining the actual wavelength of the laser based on the known wavelength of maximum absorption.

16. The method of claim 15, wherein said laser beam interacts with said vaporous material, said interaction being substantially below an opto-galvanic resonance interaction threshold.

17. The method of claim 15, wherein said laser beam interacts with said vaporous material, said laser beam having an intensity substantially below an intensity sufficient to cause opto-galvanic resonance with said vaporous material.

18. The method of claim 15, wherein said wavelength of said laser beam output from said laser is within the range of 247.9 to 248.7 nano-meters and said known wavelength of maximum absorption is about 248.327 nano-meters.

19. The method of claim 15, further including the step of diffusing the beam between an output of the laser and the lamp.

20. In a method for determining an actual wavelength of a laser beam by passing the laser beam through an hollow cathode lamp having a vaporous material selected to achieve opto-galvanic resonance with the laser beam, an improvement comprising:
- determining the wavelength of maximum absorption of the laser beam by comparing the actual wavelength at maximum absorption to a wavelength indicated by a wavelength measurement system coinciding with maximum absorption;
- driving the lamp at a level below a level sufficient to cause opto-galvanic resonance with the laser beam;
- detecting an amount of absorption of the laser beam by the vaporous material by means of a photodetector, wherein the vaporous material has a known wavelength of maximum absorption; and
- determining the actual wavelength of the laser based on the known wavelength of maximum absorption.

21. The method of claim 20, wherein said lamp includes a chamber and an anode and a cathode positioned within said chamber with said vaporous material being formed by applying a current to said anode and cathode of an amount sufficient to vaporize a portion of material forming said cathode.

22. The method of claim 20, wherein said laser beam interacts with said vaporous material, said laser beam having an intensity substantially below an intensity sufficient to cause opto-galvanic resonance with said vaporous material.

23. The method of claim 20, wherein said wavelength of said laser beam output from said laser is within the range of 247.9 to 248.7 nano-meters and said known wavelength of maximum absorption is about 248.327 nano-meters.

24. The method of claim 20, further including the step of diffusing the beam between an output of the laser and the lamp.

25. An apparatus for determining an actual wavelength of a laser being generated by a laser, wherein the laser beam has an adjustable wavelength, said apparatus comprising:
   a hollow cathode lamp positioned in a path of a portion of the laser beam output from the laser, said lamp having a chamber filled with a vaporous material having a known wavelength of maximum absorption, said laser beam illuminating a portion of said vaporous material, with a portion of said laser beam being absorbed by said vaporous material;
   a photodetector for detecting an amount of absorption of said laser beam by said vaporous material;
   a wavelength measurement system which adjusts the wavelength of the laser to a target wavelength and wherein means are provided for calibrating the wavelength measurement system based on a comparison of the actual wavelength at maximum absorption to a wavelength indicated by the wavelength measurement system coinciding with maximum absorption; and
   means for determining the actual wavelength of the laser beam from a comparison of the detected amount of absorption and the known wavelength of maximum absorption.

26. The apparatus of claim 25, wherein said lamp includes an annular cathode, said annular cathode being aligned with said laser beam whereby said beam passes through an interior of said cathode.

27. The apparatus of claim 25, wherein said lamp includes an anode and a cathode positioned within said chamber with said vaporous material being formed by applying a current to said anode and cathode of an amount sufficient to vaporize a portion of material forming said cathode.

28. The apparatus of claim 27, wherein said cathode is formed of iron.

29. The apparatus of claim 25, wherein said laser beam interacts with said vaporous material, said interaction being substantially below an opto-galvanic resonance interaction threshold.

30. The apparatus of claim 25, wherein said laser beam interacts with said vaporous material, said laser beam having an intensity substantially below an intensity sufficient to cause opto-galvanic resonance with said vaporous material.

31. The apparatus of claim 25, wherein said wavelength of said laser beam output from said laser is within the range of 247.9 to 248.7 nano-meters and said known wavelength of maximum absorption is about 248.327 nano-meters.

32. The apparatus of claim 25, further including a beam diffuser positioned along the path of the laser beam between the laser and said lamp.

33. The apparatus of claim 25, further including means for adjusting the wavelength of said laser beam throughout a wavelength range containing said wavelength of maximum absorption.

* * * * *

UNITED STATES PATENT AND TRADEMARK OFFICE
CERTIFICATE OF CORRECTION

PATENT NO. : 5,450,207
DATED : September 12, 1995
INVENTOR(S) : Fomenkov

It is certified that error appears in the above-identified patent and that said Letters Patent is hereby corrected as shown below:

[57] ABSTRACT, 9th line delete "with an expected, wavelength"
insert --with an expected wavelength--;

In column 3 at line 42 delete "when a cliffuser is"
insert --when a diffuser is--;

In column 5 at line 55 delete "tile laser beam"
insert --the laser beam--;

In column 6 at lines 41-42 delete "samples a laser beam.  A"
insert --samples a laser beam A--;

In column 7 at line 29 delete "a portion of bear A"
insert --a portion of beam A--;

UNITED STATES PATENT AND TRADEMARK OFFICE
CERTIFICATE OF CORRECTION

PATENT NO. : 5,450,207
DATED : September 12, 1995
INVENTOR(S) : Igor Fomenkov

It is certified that error appears in the above-indentified patent and that said Letters Patent is hereby corrected as shown below:

In column 11 at lines 63-64 delete "may be deter:mined based" insert --may be determined based--.

Signed and Sealed this

Twenty-seventh Day of February, 1996

Attest:

BRUCE LEHMAN

Attesting Officer  Commissioner of Patents and Trademarks